Nov. 21, 1961 J. O. TILLY 3,009,248
LETTER OPENER
Filed Oct. 15, 1959 2 Sheets-Sheet 1

INVENTOR.
James O. Tilly
BY Bacon & Thomas
ATTORNEYS

Nov. 21, 1961 J. O. TILLY 3,009,248
LETTER OPENER
Filed Oct. 15, 1959 2 Sheets-Sheet 2
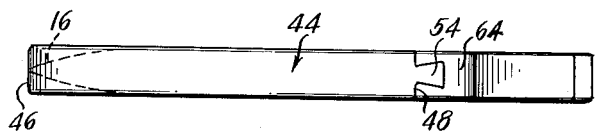
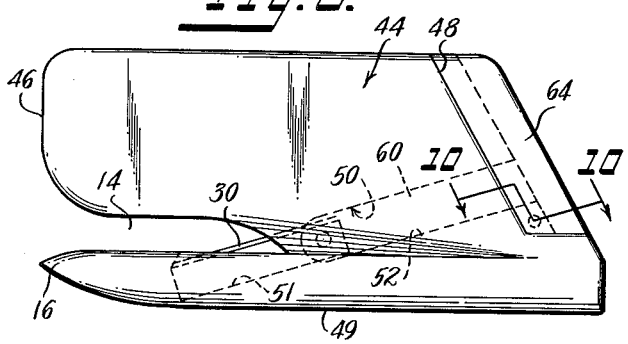
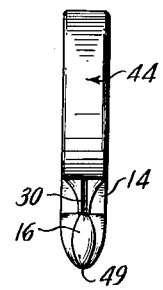
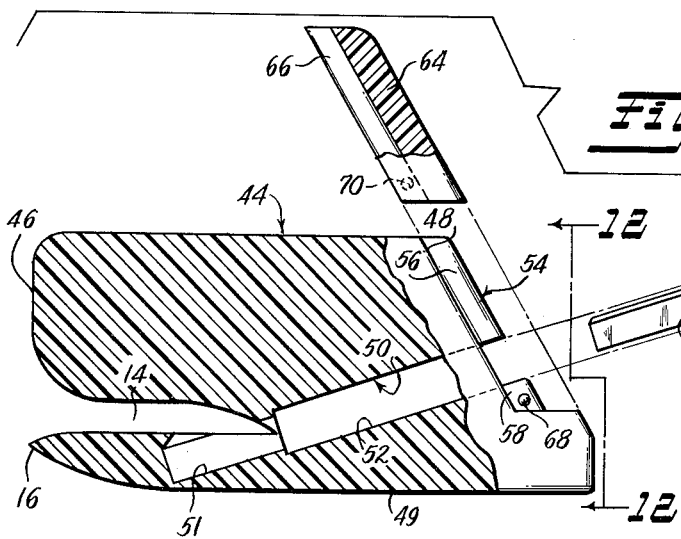
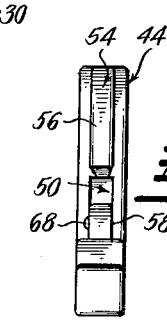
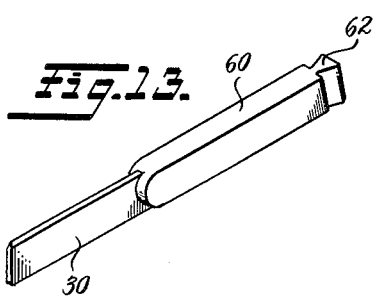
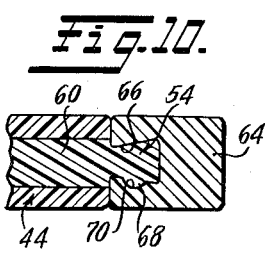
INVENTOR.
James O. Tilly
BY Bacon & Thomas
ATTORNEYS

United States Patent Office 3,009,248
Patented Nov. 21, 1961

3,009,248
LETTER OPENER
James O. Tilly, 4128 S. 32nd West Ave., Tulsa, Okla.
Filed Oct. 15, 1959, Ser. No. 846,627
4 Claims. (Cl. 30—294)

This invention relates to a novel letter opener. While the description hereinafter and appended claims refer to a letter opener, it is to be understood that the device may be used for other related purposes, such as cutting cord or thread, or slitting cardboard or other sheet material, boxes or cartons.

In general the invention comprises a one-piece molded body having a slot therein intersected by an oblique passageway. A blade holder securely holding a cutting blade is placed in the passageway so as to hold the blade with its cutting edge extending transversely across the slot. Means are provided for releasably locking the blade holder in place whereby it may be removed to replace a blade and holder when occasion demands. The entire structure is of simple molded construction involving a minimum of parts.

It is therefore an object of this invention to provide a letter opener of the type set forth having a replaceable cutting blade assembly and wherein the entire structure is of extremely simple construction, readily adaptable to production from molded plastics or the like and employing a minimum number of parts.

Another object of the invention is to provide a letter opener of the type set forth which is economical to construct, yet efficient and reliable in operation.

Additional objects and advantages will become apparent to those skilled in the art as the description proceeds with reference to the accompanying drawings, wherein:

FIGS. 7, 8 and 9 are, respectively, top plan, side elevational and front end views of a modification of the invention;

FIG. 10 is a fragmentary sectional view taken on the line 10—10 of FIG. 8;

FIG. 11 is a vertical sectional view through the embodiment of FIGS. 7 to 9 but showing the separate parts in exploded relationship;

FIG. 12 is a rear end view taken along the line 12—12 of FIG. 11; and

FIG. 13 is a perspective view of a cutting blade and holder assembly employed with this modification of the invention.

Figure 1:
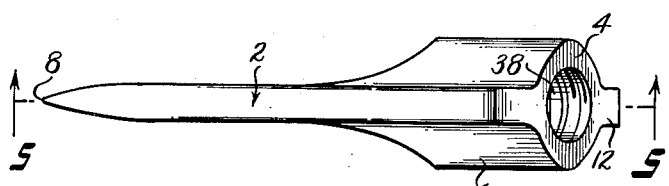
FIGS. 1, 2, 3 and 4 are, respectively, top plan, side elevational, front end and rear end views of one form of the invention.
Figure 3:
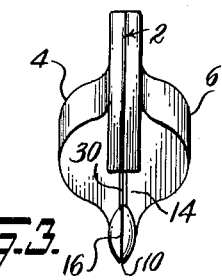

Referring first to FIGS. 1 through 6, a unitary body 2 of molded plastic or the like is of generally flat configuration but is provided with lateral enlargements 4 and 6 on opposite sides for a purpose to be described later. The body 2 is provided with a front edge 8, a bottom edge 10 and a rear edge 12. A slot 14 is formed to extend inwardly from the front edge 8 and in generally parallel spaced relationship to bottom edge 10. The lowermost portion of the body 2 is preferably pointed as at 16. An oblique passageway 18 is formed in the body 2 in oblique relation to the slot 14 and intersecting the same adjacent the rear or inner end thereof. The forward portion 20 of slot 18 is preferably flattened and relatively narrow, being only sufficiently wide to readily receive a cutting blade. Intermediate portion 22 is preferably of cylindrical sectional shape and includes an enlarged counterbore 24. The rearmost portion 26 of passageway 18 is of greater diameter than the portion 24 and is provided with internal threads 28. A cutting blade 30, which may be in the form of a conventional razor blade, is provided with an opening 32 through one end thereof. A blade holder body of molded plastic material 34 is molded in embracing relation to the perforated end of blade 30 so that the material thereof extends through the opening 32 to interlock therewith and form the unitary assembly shown in FIG. 6. The forward or shank portion of the holder 34 is of a diameter to be readily received in the portion 22 of the passageway 18 and the holder is provided with a cylindrical enlargement 36 adapted to seat in portion 24 of passageway 18. A threaded plug 38 is provided with external threads 39 matching the internal threads 28 previously described.

Figure 2:
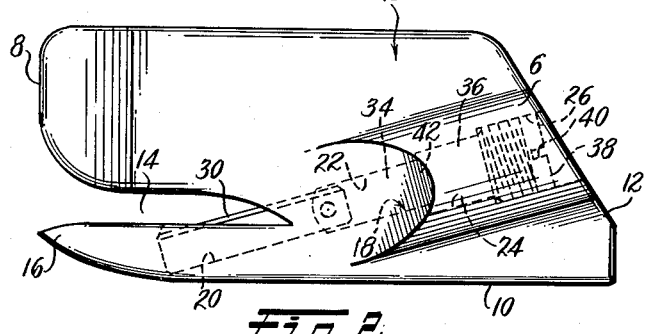
Figure 4:
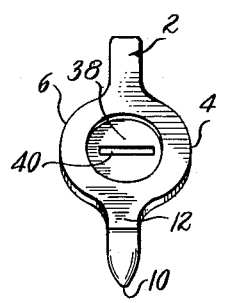
Figure 5:
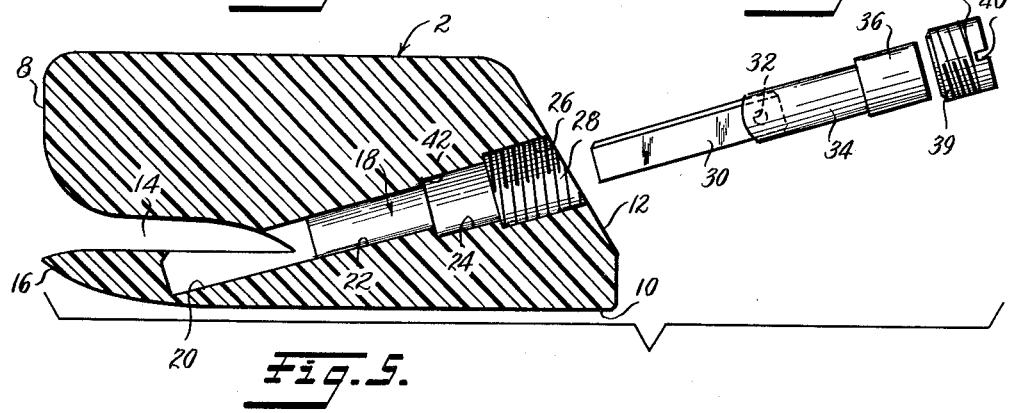
FIG. 5 is a longitudinal sectional view through the form of the invention shown in FIGS. 1 to 4 but with certain parts shown in exploded relationship.
Figure 6:
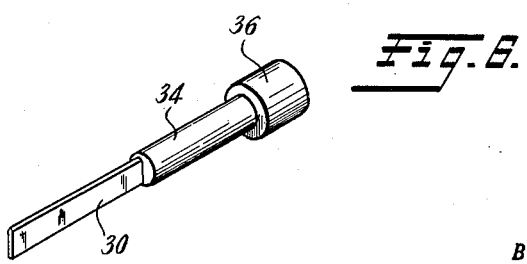
FIG. 6 is a perspective view of a cutting blade and holder.

The enlargements 4 and 6 previously referred to provide sufficient material in the body 2 to accommodate the passageway 18 and the enlarged portions 22, 24 and 26 thereof without rendering the side walls of the device too thin in those regions. The threaded plug 38 is preferably provided with a transverse slot 40 for engagement by a suitable tool whereby the plug may be screwed into or removed from the passageway 18. As will be obvious, the blade holder 34 is locked in place in passageway 18 by means of threaded plug 38, as shown in FIG. 2, to position the cutting edge of blade 30 oblique to the slot 14 and extending thereacross.

The enlargement 36 holds blade holder 34 and blade 30 in fixed longitudinal position in passageway 18 since the enlargement 36 abuts shoulder 42 and is held thereon by threaded plug 38. The narrow dimension of portion 20 of passageway 18 insures that the cutting blade will be retained in proper orientation with its cutting edge facing forwardly of slot 14. The letter opener thus described is used in a conventional and well-known manner and obviously the body portion 2 above slot 14 may be formed to any desired configuration whereby the device may be employed as an advertising novelty or the like.

A second embodiment of the invention is shown in FIGS. 7 through 13. In this embodiment the entire structure is flat and relatively thin whereby advertising material may be imprinted on the entire side faces thereof, if desired.

In this embodiment a flat body portion 44 having a front edge 46, rear edge 48 and bottom edge 49 is likewise provided with the previously described slot 14, the same as described in connection with FIGS. 1 through 6. The body portion 44 is provided with an oblique passageway 50 therethrough extending in oblique relation to the slot 14. The forward portion 51 of passageway 50 is relatively flat and narrow, similar to the portion 20 of FIGS. 1 to 5 and intersects the rear portion of slot 14, whereas the rearmost portion 52 thereof is of generally rectangular sectional shape and substantially wider than the forward portion 51. The portion 52 of passageway 50 extends through the rear edge 48 generally centrally thereof and interrupts a dove-tailed rib 54 extending centrally along a portion of rear edge 48. The interrupted dove-tailed rib 54 thus comprises an upper portion 56 and a lower portion 58 in alignment with each other.

The cutting blade 30 is provided with the previously described opening 32 and a holder 60 therefor is molded about the end of blade 30 and interlocks with opening 32 to securely hold the blade in assembled relation to the holder. The holder 60 is of rectangular cross-sectional shape adapted to slide readily in the portion 52 of passageway 50. The holder 60 is of such length that when the blade 30 is in the position shown in FIG. 8, the rearmost end of holder 60 is aligned with the crest of dove-tailed rib 54. The rearmost end of holder 60 is likewise formed to define a transverse dove-tailed rib section 62 of the same shape as rib 54 and comprising a continuation thereof between the upper and lower portions 56 and 58.

A locking member 64 is provided with a longitudinal dove-tailed groove 66 extending along one edge thereof and complementary to the dove-tailed rib 54. When the holder 60 and blade 30 are in position in passageway 50, as shown in FIG. 8, the locking member 64 is placed in a position with its groove 66 aligned with the dove-tailed rib 54 and is then slidingly moved downwardly with groove 66 embracing rib 54 to span the upper and lower sections 56 and 58 and also engage the dove-tailed rib section 62 to thereby securely lock blade 30 and holder 60 in the position shown in FIG. 8. If desired, a dimple or projection 68 may be molded on one side face of the lower section of rib 54 and one side of the dove-tailed groove 66 may be provided with a depression 70 adapted to receive the projection 68. As will be obvious, when the locking member 64 is moved to the position shown in FIG. 8, the dimple or projection 68 will snap into depression 70 and hold the locking member 64 in the described position. It is to be remembered that the molded material of which locking member 64 is made is quite resilient, thus the side walls of groove 66 resiliently spread apart sufficiently to permit the dimple 68 to enter the groove 66 and thereafter snap into depression 70.

While a limited number of specific embodiments of the invention are shown and described herein, it is to be understood that the invention contemplates other embodiments falling within the scope of the appended claims.

I claim:

1. In a letter opener, a unitary body having front, rear, and bottom edges, a slot extending inwardly from said front edge adjacent and generally parallel to said bottom edge, a peripherally closed passageway in said body extending through said rear edge and communicating with said slot at a position spaced inwardly from said front edge, a blade holder slidable in said passageway, a cutting blade fixedly secured to said blade holder and having a cutting edge extending obliquely across said slot and facing toward said front edge, and locking means cooperating with said body and blade holder for removably locking said blade holder at said rear edge in a fixed position in said passageway.

2. A letter opener as defined in claim 1 wherein a dove-tailed rib extending along said rear edge of said body and being interrupted by said passageway, said blade holder extending to the crest of said dove-tailed rib and being formed, at its rear end, to the same shape as said dove-tailed rib to define a continuation thereof, said locking means comprising a member having a dove-tailed groove therein slidably embracing said dove-tailed rib and the rear end portion of said blade holder to lock the latter in said passageway.

3. A letter opener as defined in claim 1 wherein said locking means is of resilient material and is provided with integral means releasably interlocking with an adjacent portion of said body for releasably holding the same in assembled relation.

4. A letter opener as defined in claim 3 wherein said locking means comprises a projection on a side of said dove-tailed rib and a complementary depression in one side of said dove-tailed groove.

References Cited in the file of this patent

UNITED STATES PATENTS

| | | |
|---|---|---|
| 2,119,045 | Dietrich | May 31, 1938 |
| 2,124,615 | Foltz | July 26, 1938 |
| 2,266,916 | Steele | Dec. 23, 1941 |
| 2,439,639 | Tilly | Apr. 13, 1948 |
| 2,535,555 | Tilly | Dec. 26, 1950 |
| 2,550,346 | Gregg | Apr. 24, 1951 |
| 2,593,601 | Pollak | Apr. 22, 1952 |
| 2,601,414 | Mittelstaedt | June 24, 1952 |
| 2,882,598 | Fidelman | Apr. 21, 1959 |